United States Patent
Jarry et al.

(10) Patent No.: US 10,197,274 B2
(45) Date of Patent: Feb. 5, 2019

(54) INTEGRATED PROCESS FOR OXY-FUEL COMBUSTION AND PRODUCTION OF OXYGEN

(71) Applicant: L'Air Liquide, Societe Anonyme pour l'Etude et l'Exploitation des Procedes Georges Claude, Paris (FR)

(72) Inventors: Luc Jarry, Beaufai (FR); Nicolas Spiegl, Frankfurt (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 397 days.

(21) Appl. No.: 15/107,542

(22) PCT Filed: Dec. 19, 2014

(86) PCT No.: PCT/FR2014/053478
§ 371 (c)(1),
(2) Date: Jun. 23, 2016

(87) PCT Pub. No.: WO2015/097389
PCT Pub. Date: Jul. 2, 2015

(65) Prior Publication Data
US 2016/0313001 A1    Oct. 27, 2016

(30) Foreign Application Priority Data
Dec. 23, 2013    (FR) ...................... 13 63503

(51) Int. Cl.
*F23L 7/00* (2006.01)
*C01B 13/02* (2006.01)
(Continued)

(52) U.S. Cl.
CPC .......... *F23L 7/007* (2013.01); *C01B 13/0255* (2013.01); *C03B 5/2353* (2013.01);
(Continued)

(58) Field of Classification Search
CPC .............. F23L 7/00; F23L 15/04; F23D 14/66
(Continued)

(56) References Cited

U.S. PATENT DOCUMENTS 6,071,116 A    6/2000   Philippe et al.
7,062,912 B2 *  6/2006   Penfornis ................ F01K 3/185
                                                       60/649

(Continued)

FOREIGN PATENT DOCUMENTS

EP    1338848 A2    8/2003
EP    2026004 A1    2/2009
(Continued)

OTHER PUBLICATIONS

International Search Report and Written Opinion for PCT/FR2014/053478, dated Mar. 25, 2015 (with machine translation).

*Primary Examiner* — Gregory Huson
*Assistant Examiner* — Nikhil Mashruwala
(74) *Attorney, Agent, or Firm* — Christopher J. Cronin

(57) ABSTRACT

Process for heating via oxy-fuel combustion in which a stream of air is heated by means of at least one portion of the residual heat present in the fuel gases discharged from the combustion chamber, at least one portion of said hot air stream is introduced into an oxygen production unit in which a portion of the oxygen present in the hot air stream is extracted by means of one or more ITM, with a first stream of oxygen at high temperature being obtained, said first stream of oxygen is mixed with a second stream of oxygen so as to obtain a total stream of oxygen at a lower temperature than that of the first stream of oxygen, at least one portion of the total stream of oxygen being transported to the combustion chamber and used within as oxygen-rich oxidizer.

10 Claims, 1 Drawing Sheet

(51) Int. Cl.
*C03B 5/235* (2006.01)
*F23L 15/04* (2006.01)
*F23D 14/66* (2006.01)
*F23L 9/00* (2006.01)

(52) U.S. Cl.
CPC .............. *F23D 14/66* (2013.01); *F23L 9/00* (2013.01); *F23L 15/04* (2013.01); *F23L 2900/07007* (2013.01); *F23N 2021/06* (2013.01); *Y02E 20/344* (2013.01); *Y02E 20/348* (2013.01); *Y02P 20/125* (2015.11); *Y02P 20/129* (2015.11); *Y02P 40/55* (2015.11); *Y02P 40/57* (2015.11)

(58) Field of Classification Search
USPC .................................................. 431/11, 8, 10
See application file for complete search history.

(56) References Cited

U.S. PATENT DOCUMENTS

| | | | |
|---|---|---|---|
| 8,851,883 B2* | 10/2014 | Jarry | ............ C03B 5/2353 |
| | | | 126/99 R |
| 9,945,558 B2* | 4/2018 | Uchida | ............ F23C 9/08 |
| 2011/0041740 A1* | 2/2011 | Reilly | ............ F23C 9/00 |
| | | | 110/341 |
| 2016/0320057 A1* | 11/2016 | Jarry | ............ C03B 5/2353 |

FOREIGN PATENT DOCUMENTS

| | | |
|---|---|---|
| EP | 2299090 A2 | 3/2011 |
| EP | 2551243 A1 | 1/2013 |
| WO | 2009118333 A1 | 10/2009 |
| WO | 2010000709 A1 | 1/2010 |
| WO | 2011015616 A1 | 2/2011 |

* cited by examiner

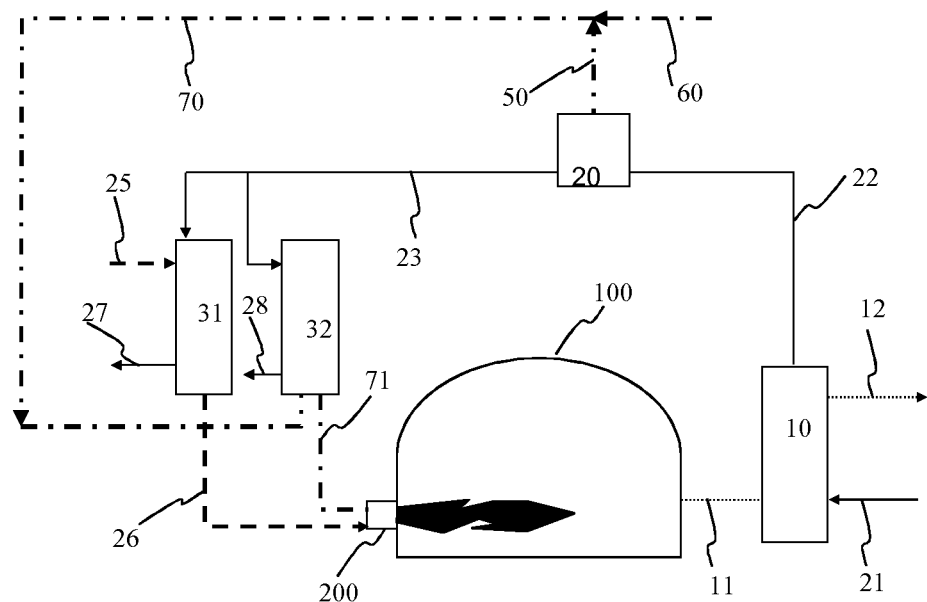

INTEGRATED PROCESS FOR OXY-FUEL COMBUSTION AND PRODUCTION OF OXYGEN

CROSS-REFERENCE TO RELATED APPLICATIONS

This application is a § 371 of International PCT Application PCT/FR2014/053478, filed Dec. 19, 2014, which claims § 119(a) foreign priority to French patent application FR 1 363 503, filed Dec. 23, 2013.

BACKGROUND

Field of the Invention

The present invention relates to an oxy-fuel combustion process integrating the production or generation of oxygen.

Related Art

It is known to extract oxygen from a gas, such as air, by means of ion transport membranes (ITMs), also known as "solid electrolytes". Said ITMs are capable of ionizing the oxygen molecules present in the air which comes into contact with a first face of the ITM, of selectively transporting the oxygen ions through the ITM and of reconstituting oxygen molecules from said oxygen ions on the face of the membrane opposite the first face (in the direction of movement of the oxygen ions).

It is also known to use oxygen thus produced as oxidant (combustion oxidizer) for the combustion of a fuel and the production of heat.

WO-A-2011/015616 discloses a process for the operation of a glass melting furnace in which the burners are supplied, on the one hand, with fuel and, on the other hand, with hot oxygen resulting directly from an ITM oxygen extractor. According to WO-A-2011/015616, if the contribution of oxygen from the extractor is insufficient, an additional contribution of oxygen is carried out directly to the burner. The flue gases exiting from the melting furnace are passed into a first heat exchanger, referred to as primary exchanger, for the reheating of a heat-exchange fluid, in particular air. The air thus reheated supplies a series of secondary heat exchangers in which compressed air circulates, typically at a pressure of the order of 1.5 to $2\times10^6$ Pa. After passing through the secondary exchangers, the compressed air exhibits a temperature of 500° C. to 550° C. This hot compressed air can be further reheated in a boiler in order to reach higher temperatures, for example of the order of 900° C. The hot compressed air thus obtained passes over the ITM extractor for the production of oxygen and the oxygen thus extracted from the hot compressed air is directed directly to a burner. The oxygen-depleted air can be used to activate a turbine for the production of the compressed air introduced into the ITM extractor.

As indicated in WO-A-2011/015616, the properties of hot oxygen, as it exits from the ITM extractor, impose practical limits on the devices in which the hot oxygen circulates. It is thus particularly indicated to use the oxygen immediately after its extraction and thus to locate the ITM extractor close to the burners of the furnace in order to limit the course followed by the oxygen up to the burner, in order to limit the risks of damage to the devices in contact with this oxygen.

The need, for the sake of safety, to locate each extractor close to the associated burner greatly limits the advantage of the process described in WO-A-2011/015616.

This is because the immediate vicinity of a glass melting furnace is generally very restricted in space, in particular at the burners, especially with the devices for supplying the burners with oxidant and the devices for supplying the burners with fuel and, if appropriate, devices for the preheating of the oxidant and/or of the fuel upstream of the burners. Despite this restriction in space, it remains necessary to provide easy access to said burners in order to allow them to be maintained and repaired.

Furthermore, the melting furnaces often comprise a large number of burners. To produce small ITM oxygen extractors, which are unitary for each burner, considerably increases the cost of the installations.

Consequently, the current design of the furnaces generally does not make possible the introduction of ITM oxygen extractors immediately upstream of the burners, as provided in WO-A-2011/015616, whereas, as also explained in WO-A-2011/015616, installation of the ITM extractor at a greater distance from the burner presents a safety problem, generally unacceptable to the operator of the furnace, related to the transportation of oxygen at high temperature.

SUMMARY OF THE INVENTION

It is an aim of the present invention to at least partially overcome the problems described above.

The present invention more particularly provides a process for heating by oxy-fuel combustion in a furnace, in which a fuel is incinerated with an oxygen-rich oxidant in a combustion chamber of the furnace with generation of heat and flue gases in the combustion chamber. The flue gases generated are discharged from the combustion chamber, said discharged flue gases containing residual heat.

According to the invention, a stream of air is heated by means of at least a part of the residual heat present in the discharged flue gases. A stream of hot air having a temperature TA1 is thus obtained. The temperature TA1 is chosen so as to make possible extraction of oxygen from the hot air by an ITM.

At least a part of the stream of hot air is introduced into an oxygen production unit in which a portion of the oxygen present in said at least a part of the stream of hot air is extracted by means of one or more ITMs. In this way, a first oxygen stream at a temperature TO1 and a stream of oxygen-depleted air having a temperature TA2, with TA2<TA1, are obtained.

Downstream of this oxygen production unit, the first oxygen stream is mixed with a second oxygen stream so as to obtain an overall oxygen stream at a temperature TO2, with TO2<TO1. The lower temperature TO2 is generally obtained owing to the fact that the temperature of the second oxygen stream is less than the temperature TO1 of the first oxygen stream.

At least a part of the overall oxygen stream is then transported to the combustion chamber of the furnace and used as oxygen-rich oxidant in the combustion chamber. According to the invention, said at least a part of the overall oxygen stream is heated directly upstream of the combustion chamber to a temperature TOf, with TOf>TO2.

The term "furnace" is understood to mean an apparatus or an installation in which a material or components other than the fuel and the oxidant are heated for the purpose of subjecting this material or these components to physical or chemical transformations under the effect of the heat supplied, for example a melting furnace, a calcination furnace, a steel reheating furnace, and the like.

The term "residual heat" is understood to mean the heat which is discharged from a combustion chamber with the flue gases generated by the combustion in the chamber.

The term "oxygen-rich" or simply "rich" oxidant or gas is understood to mean an oxidant or gas having an oxygen content of greater than 60 vol %.

According to the invention, the residual heat from the discharged flue gases is thus used in order to heat a stream of air up to a temperature TA1 which makes possible extraction of oxygen by an ITM at an industrial level.

Downstream of the production unit, the first oxygen stream exhibits a high temperature such that the transportation of this first oxygen stream would present a safety problem.

By mixing, according to the invention, the first stream with a second oxygen stream, it is possible to produce an overall oxygen stream having a lower temperature TO2, which makes possible the safe transportation of the overall stream, without, however, losing the thermal energy present in the first oxygen stream at the outlet of the production unit.

Contributing a second oxygen stream, coming from a source other than the production unit, also makes it possible to avoid problems due to the limited production capacity of the majority of the ITM-based oxygen production units.

The heating of the stream of air by means of residual heat present in the discharged flue gases can be carried out in a heat recovery unit or exchanger.

According to an advantageous embodiment of the invention, the stream of hot air, at least a part, indeed even all, of which is introduced into the oxygen production unit, exhibits a temperature TA1 of 700° C. to 1000° C., preferably of 750° C. to 950° C. and more preferably of 800° C. to 900° C. These temperatures facilitate the extraction of oxygen by an ITM.

The at least a part of the stream of hot air preferably exhibits a pressure PA1 of 1 bar ab to 6 bar ab at the inlet of the oxygen production unit, preferably of 1 bar ab to 3 bar ab and more preferably of 1 bar ab to 2 bar ab.

The portion of oxygen extracted from the at least a part of the stream of hot air can correspond to between 10% and 100%, preferably between 20% and 70% and more preferably between 20% and 50% of the oxygen present in said at least a part of the stream of hot air. Although an extraction as complete as possible of the oxygen is desired, a partial extraction is often more profitable and thus preferable in an industrial context.

The first oxygen stream resulting from the production unit can correspond to between 90 vol % and 0 vol %, preferably between 90 vol % and 15 vol %, more preferably between 80 vol % and 20 vol, indeed even between 80 vol % and 30 vol % and more preferably between 80 vol % and 50 vol % of the overall oxygen stream.

According to the invention, the use of an overall stream not containing oxygen resulting from the production unit and thus consisting entirely of oxygen coming from another source is exceptional and limited in time (and not during the complete duration of the process). However, such an overall stream makes continuous operation of the combustion chamber possible despite a shutdown of or breakdown in the oxygen production unit.

The second oxygen stream is supplied by an air separation unit, such as a PSA (Pressure Swing Adsorption) unit or a VPSA (Vacuum Pressure Swing Adsorption) unit, a liquefied oxygen tank or a gaseous or liquefied oxygen pipeline.

The present invention is of particular use in processes using a preheated rich oxidant. In the present context, the term "preheating" refers to the heating of a product, such as a fuel, an oxidant or also a feedstock to be heated or melted, before it is introduced into the combustion chamber.

According to the invention, the at least a part of the overall oxygen stream is advantageously heated to a temperature TOf between 250° C. and 620° C., preferably between 300° C. and 600° C. and more preferably between 350° C. and 580° C. directly upstream of the combustion chamber, that is to say directly upstream of burners or lances with which the combustion chamber is equipped and which are used for the injection of preheated oxygen into the combustion chamber.

The stream of oxygen-depleted air is advantageously used for the preheating of the at least a part of the overall oxygen stream, for example by heat exchange between the depleted air and the at least a part of the overall stream in a heat exchanger.

This is because, depending on the temperature TA1 of the air at the inlet of the oxygen production unit, the stream of depleted air at the outlet of this oxygen production unit can exhibit a temperature TA2 of 400° C. to 750° C., preferably of 450° C. to 700° C. and more preferably of 500° C. to 650° C. This stream of oxygen-depleted air thus exhibits a thermal energy which can usefully be used to increase the energy output of the process.

Thus, according to one embodiment, the at a least a part of the overall oxygen stream is heated directly upstream of the combustion chamber by heat exchange with the stream of oxygen-depleted air resulting from the oxygen production unit. It is also advantageous to preheat at least a part of the fuel incinerated in the combustion chamber. In this case, it is preferable for at least a part of the fuel incinerated in the combustion chamber to be preheated upstream of the combustion chamber by heat exchange with the stream of oxygen-depleted air resulting from the oxygen production unit, typically in a heat exchanger.

The term "heat exchanger" or "exchanger" is understood to mean an installation or a device in which two fluids of different temperatures circulate in separate chambers and transmit heat from one of the two fluids (hottest fluid) to the other of the two fluids (coldest fluid) through one or more walls separating the two chambers, and thus without direct contact or mixing between the two fluids.

The use of other heat sources for the preheating of the oxygen and/or of the fuel, alone or preferably in combination with a heat exchange with the stream of oxygen-depleted air, is not, however, ruled out.

The process according to the invention is of use and advantageous for any high-temperature combustion chamber of a furnace. The combustion chamber can thus be a melting chamber, such as a chamber for the melting of metals or preferably a chamber for the melting of vitrifiable material. An example of such a melting chamber is a glass melting chamber of float type. The chamber can also be a calcination chamber, for example for the calcination of cement, or also a reheating chamber, such as in particular steel reheating chambers.

It should be noted that the term "combustion chamber" is not limited to static combustion chambers but also covers rotary combustion chambers.

BRIEF DESCRIPTION OF THE FIGURES

FIG. 1 is a schematic of an embodiment of the invention.

DETAILED DESCRIPTION OF THE INVENTION

The invention and its advantages will be better understood in the light of the example below of a process according to the invention and of an installation suitable for the implementation of such a process, reference being made to FIG. 1, which is a diagrammatic representation of such an installation for the melting of glass suitable for the implementation of the process according to the invention.

Said installation comprises a combustion chamber 100 of a furnace, more particularly a glass melting or melting/refining chamber, provided with one or more burners 200 suitable for the combustion of a preheated oxygen-rich fuel.

The installation also comprises a system for distributing oxygen-rich oxidant for supplying said burners 200 with oxidant, and also a system for distributing fuel for supplying said burners 200 with fuel (for example, natural gas).

Although just one burner is represented in the FIGURE, the combustion chamber typically comprises several burners, and even a large number of burners, for example in the case of a melting furnace of float type.

The flue gases generated by the combustion are discharged from the combustion chamber 100 and sent to a circuit for discharge of the flue gases 11.

One or more heat exchangers 10, referred to as primary exchangers, are placed on the circuit for discharge of the flue gases 11 downstream of the combustion chamber 100. In the primary exchanger 10, a part of the residual heat from the discharged flue gases is transferred to a stream of air 21, with, on the one hand, a stream of hot air 22 and, on the other hand, a stream of tempered discharged flue gases 12 being obtained.

The hot air reaches a temperature of the order of 700° C. and up to 900° C., indeed even up to 950° C., at the outlet of the primary exchanger 10.

The stream of hot air 22 is thus brought to a level of temperature at which the extraction of the oxygen over an ITM can be carried out on an industrial scale. It is at a pressure close to atmospheric pressure.

This stream of hot air 22 is introduced into an unit for the production of oxygen by extraction by means of a ceramic ITM 20 with a capacity of 1 to 100 tonnes of oxygen per day.

At these pressures and with a suitable membrane surface area, the extraction output is, for example, of the order of 50%.

Thus, a first oxygen stream 50 and also a stream of oxygen-depleted air 23 are obtained at the outlet of the production unit 20.

The first oxygen stream 50 produced from an ITM is hot, with a temperature TO1 of the order of 900° C. This hot oxygen 50 is directly injected into a system for distribution of oxygen, where it is mixed with colder oxygen 60 resulting from another source of oxygen (such as an ASU (Air Separation Unit), a VSA (Vacuum Swing Adsorption) unit, a LOX (liquid oxygen) tank or a gaseous oxygen circuit).

An overall oxygen stream 70, containing from 20 to 25 vol % (and up to 50 vol %) of oxygen resulting from the ITM oxygen production unit and from 75 to 80 vol % (and down to 50 vol %) of oxygen resulting from the other oxygen source, is thus obtained.

The hot oxygen produced from an ITM is thus cooled without loss of energy for the installation and can without risk be transported in the oxygen distribution system, the materials of which do not have to withstand the highly aggressive conditions of the very-high-temperature oxygen.

The mixture of oxygen from different sources thus obtained is then used as oxygen-rich oxidant to generate the combustion of the fuel in the combustion/melting chamber 30.

According to the invention, it is possible to optimize the configuration of the glass melting installation by positioning the oxygen production unit or units 20 at the most appropriate spot, even if this is at a distance from the burners 200 of the combustion chamber 100, and it is not necessary to use, for the transportation of the overall oxygen stream 70, materials, generally very expensive materials, which withstand the high-temperature oxygen.

In the embodiment illustrated, the production of oxygen by an ITM is integrated with a technology for preheating oxygen and the fuel, for example natural gas, for supplying the oxy-fuel combustible burners 200 of the combustion chamber 100 of the glass melting installation.

A similar technology for preheating oxygen is known in particular from U.S. Pat. No. 6,071,116.

The oxygen-depleted air 23 resulting from the oxygen production unit 20, which exhibits a temperature TA2 of the order of 450° C., is channeled to secondary heat exchangers 31 and 32.

In the first secondary exchanger 31, a part of the oxygen-depleted air 23 is used for the preheating of the fuel 25, for example natural gas, upstream of the burners 200 of the combustion chamber 100. A stream of preheated fuel 26, which is supplied to the burners 200, and a first tempered stream of oxygen-depleted air 27 are obtained.

Similarly, in the second secondary exchanger 32, a part of the oxygen-depleted air 23 is used for the preheating of at least a part of the overall oxygen stream 70 upstream of said burners 200. A stream of preheated oxygen 71, which is supplied to the burners 200, and a second tempered stream of oxygen-depleted air 28 are obtained.

Just one first secondary exchanger 31 and just one second secondary exchanger 32 are shown in FIG. 1. However, the installation can comprise several first secondary exchangers 31 and several second secondary exchangers 32. In particular, when the combustion chamber comprises a large number of burners 200, the installation can comprise a number of first secondary exchangers 31 and a number of second secondary exchangers 32, each heat exchanger 31 and 32 supplying a limited number of burners 200, indeed even just one burner 200. This makes it possible in particular to limit the pipelines for the transportation of preheated fuel or preheated oxygen respectively.

Although, according to the invention, the oxygen produced from an ITM is cooled by mixing it with oxygen from another source, the invention nevertheless makes it possible, to have a temperature of the oxygen (oxygen mixture or overall oxygen stream) at the inlet of the secondary exchanger 32, of typically approximately 300° C., and thus to reduce the size and the cost of the secondary exchanger(s) 32 for the preheating of the oxygen.

The present invention thus makes it possible to use the residual heat from the flue gases discharged from the combustion chamber 100 for the production of oxygen and for the preheating of the fuel and of an oxygen-rich oxidant, to optimize the configuration of the installation and to limit the use of materials which have to withstand hot oxygen.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for heating by oxy-fuel combustion in a furnace, comprising the steps of:
    incinerating a fuel with an oxygen-rich oxidant in a combustion chamber of the furnace with generation of heat and flue gases in the combustion chamber;
    discharging the generated flue gases from the combustion chamber, said discharged flue gases containing residual heat;
    heating a stream of air with at least a part of the residual heat present in the discharged flue gases to produce a stream of hot air at a temperature $TA1$;
    introducing at least a part of the stream of hot air into an oxygen production unit in which a portion of the oxygen present in said at least a part of the stream of hot air is extracted with one or more ITMs, thereby producing a first oxygen stream at a temperature $TO1$ and a stream of oxygen-depleted air at a temperature $TA2$ in which $TA2<TA1$;
    downstream of the oxygen production unit, mixing the first oxygen stream with a second oxygen stream to thereby produce an overall oxygen stream at a temperature $TO2$ in which $TO2<TO1$, the second oxygen stream being supplied by an air separation unit, a liquefied-oxygen tank or a gaseous- or liquefied-oxygen pipeline;
    transporting at least a part of the overall oxygen stream to the combustion chamber and using said at least a part of the overall oxygen stream as oxygen-rich oxidant in the combustion chamber, said at least a part of the overall oxygen stream being heated to a temperature $TOf$ upstream of the combustion chamber in which $TOf>TO2$, wherein at least a part of the fuel incinerated in the combustion chamber is preheated upstream of the combustion chamber by heat exchange with the stream of oxygen-depleted air resulting from the oxygen production unit.

2. The heating process of claim 1, in which the stream of hot air exhibits a temperature $TA1$ of 700° C. to 1000° C.

3. The process of claim 1, in which the stream of hot air exhibits a pressure $PA1$ of 1 bar ab to 6 bar ab at the inlet of the oxygen production unit.

4. The process of claim 1, in which the portion of oxygen extracted from the at least a part of the stream of hot air corresponds to between 10% and 100% of the oxygen present in said at least a part of the stream of hot air.

5. The process of claim 1, in which the temperature $TA2$ of the stream of oxygen-depleted air is from 400° C. to 750° C.

6. The process of claim 1, in which the first oxygen stream corresponds to between 90 vol % and 15 vol % of the overall oxygen stream.

7. The process of claim 1, in which the second oxygen stream is also supplied by a Pressure Swing Adsorption unit or a Vacuum Pressure Swing Adsorption unit.

8. The process of claim 1, in which the at least a part of the overall oxygen stream is heated to a temperature $TOf$ between 250° C. and 620° C. upstream of the combustion chamber.

9. The process of claim 1, in which the at least a part of the overall oxygen stream is heated upstream of the combustion chamber by heat exchange with the stream of oxygen-depleted air resulting from the oxygen production unit.

10. The process of claim 1, in which the combustion chamber is:
    a melting chamber for the melting of vitrifiable material;
    a calcination chamber; or
    a steel reheating chamber.

* * * * *